US009483941B1

(12) United States Patent
Childress et al.

(10) Patent No.: US 9,483,941 B1
(45) Date of Patent: Nov. 1, 2016

(54) COMMUNICATING AN ALERT NOTIFICATION TO A PARTICULAR VEHICLE

(71) Applicant: International Business Machines Corporation, Armonk, NY (US)

(72) Inventors: Rhonda L. Childress, Austin, TX (US); Kim A. Eckert, Austin, TX (US); Ryan D. McNair, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/141,534

(22) Filed: Apr. 28, 2016

(51) Int. Cl.
| | | |
|---|---|---|
| *G08G 1/00* | (2006.01) | |
| *G08G 1/0967* | (2006.01) | |
| *B60Q 9/00* | (2006.01) | |
| *B60R 1/00* | (2006.01) | |

(52) U.S. Cl.
CPC ........... *G08G 1/096791* (2013.01); *B60Q 9/00* (2013.01); *B60R 1/00* (2013.01)

(58) Field of Classification Search
CPC ............................... G08G 1/00; G08G 1/123
USPC .............. 340/902, 903, 988, 426.21, 539.17, 340/467, 479; 701/1, 29
See application file for complete search history.

(56) References Cited

U.S. PATENT DOCUMENTS

| | | | | |
|---|---|---|---|---|
| 5,572,201 A | * | 11/1996 | Graham ............... | G08G 1/0965 340/901 |
| 2003/0141990 A1 | * | 7/2003 | Coon ..................... | G08G 1/202 340/902 |
| 2007/0063824 A1 | | 3/2007 | Gaddy | |
| 2009/0325538 A1 | | 12/2009 | Sennett et al. | |
| 2011/0121991 A1 | | 5/2011 | Basir | |
| 2015/0381551 A1 | | 12/2015 | Cai et al. | |

OTHER PUBLICATIONS

Knight, W., "Car-to-Car Communication a simple wireless technology promises to make driving much safer", MIT Technology Review, 2016, pp. 1-16, United States [downloaded from https://www.technologyreview.com/s/534981/car-to-car-communication/ on Mar. 11, 2016].
Anonymous, "Amateur radio", Wikipedia, Feb. 27, 2016, pp. 1-13, United States [downloaded from https://en.wikipedia.org/wiki/Amateur_radio on Mar. 11, 2016].
Anonymous, "Headlight flashing", Wikipedia, Feb. 25, 2016, pp. 1-8, United States [downloaded from https://en.wikipedia.org/wiki/Headlight_flashing on Mar. 11, 2016].

* cited by examiner

*Primary Examiner* — Tai Nguyen
(74) *Attorney, Agent, or Firm* — Sherman IP LLP; Kenneth L. Sherman; Steven Laut

(57) ABSTRACT

Communicating a notification to a particular vehicle is provided. A processor: identifies, one or more vehicles within a particular radius to a first vehicle based on one of: WiFi network visibility, a geo-fenced radius with known geo-tags of the one or more vehicles, or scanning for visible Bluetooth devices; receives a selection for a particular vehicle of the one or more vehicles identified based on descriptive wireless tags or line-of-sight selection from a first device in the first vehicle; establishes a connection between the first device in the first vehicle and a second device in the particular vehicle; receives a selection for a predetermined message; receives an image of a problem associated with the particular vehicle; and sends the predetermined message and the image from the first device to the second device.

1 Claim, 4 Drawing Sheets

COMMUNICATING AN ALERT NOTIFICATION TO A PARTICULAR VEHICLE

BACKGROUND

Drivers of vehicles may notice a problem with another vehicle while driving near the other vehicle. Typically, the driver that noticed the problem waves their arms or honks their horn to notify the driver of a problem. The driver having the problem with their vehicle, however, may not understand the driver or may be hesitant due to safety and trust issues.

SUMMARY

Embodiments relate to wirelessly alerting a driver in another vehicle of a potential or actual problem. One embodiment includes a computer program product for communicating a notification to a particular vehicle, the computer program product comprising a computer readable storage device having program instructions embodied therewith, the program instructions executable by a processor to cause the processor to: identify, by the processor, one or more vehicles within a particular radius to a first vehicle based on one of: WiFi network visibility, a geo-fenced radius with known geo-tags of the one or more vehicles, or scanning for visible Bluetooth devices. The processor receives a selection for a particular vehicle of the one or more vehicles identified based on descriptive wireless tags or line-of-sight selection from a first device in the first vehicle. The processor further establishes a connection between the first device in the first vehicle and a second device in the particular vehicle; receives a selection for a predetermined message; receives an image of a problem associated with the particular vehicle; and sends the predetermined message and the image from the first device to the second device.

These and other features, aspects and advantages of the present invention will become understood with reference to the following description, appended claims and accompanying figures.

DETAILED DESCRIPTION

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

One or more embodiments provide for wirelessly alerting a driver in another vehicle of a potential or actual problem. One embodiment includes a computer program product for communicating a notification to a particular vehicle, the computer program product comprising a computer readable storage device having program instructions embodied therewith, the program instructions executable by a processor to cause the processor to: identify, by the processor, one or more vehicles within a particular radius to a first vehicle based on one of: WiFi network visibility, a geo-fenced radius with known geo-tags of the one or more vehicles, or scanning for visible Bluetooth devices. The processor receives a selection for a particular vehicle of the one or more vehicles identified based on descriptive wireless tags or line-of-sight selection from a first device in the first vehicle. The processor further establishes a connection between the first device in the first vehicle and a second device in the particular vehicle; receives a selection for a predetermined message; receives an image of a problem associated with the particular vehicle; and sends the predetermined message and the image from the first device to the second device.

Figure 1:
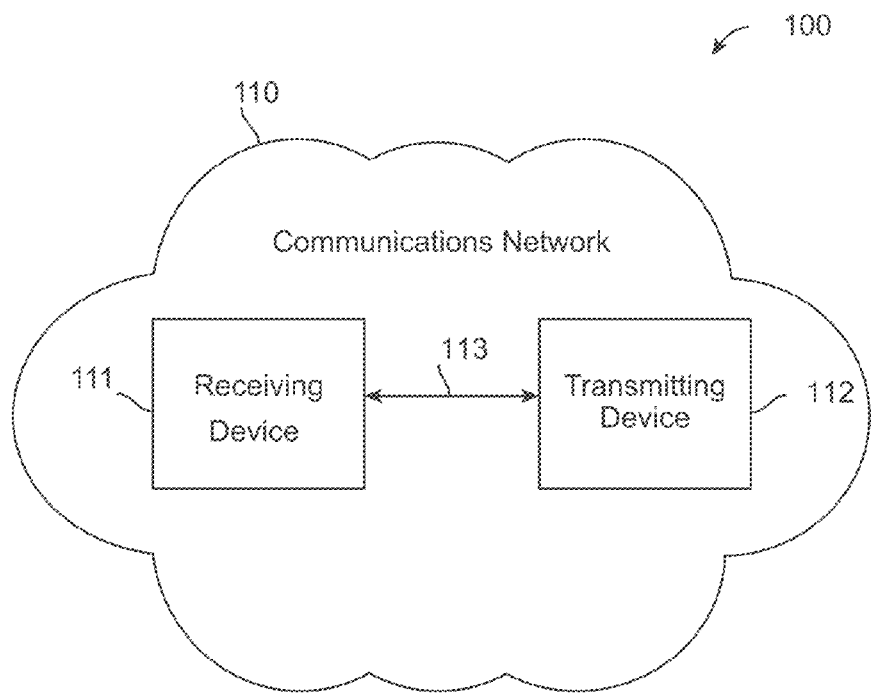
FIG. 1 shows a schematic view of a communications system, according to an embodiment.

FIG. 1 is a schematic view of a communications system 100, in accordance with one embodiment. Communications system 100 may include a communications device that initiates an outgoing communications operation (transmitting device 112) and a communications network 110, which transmitting device 112 may use to initiate and conduct communications operations with other communications devices within communications network 110. For example, communications system 100 may include a communication device (receiving device 111) that receives the communications operation from the transmitting device 112. Although communications system 100 may include multiple transmitting devices 112 and receiving devices 111, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), BLUETOOTH®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices. Such protocols may include, for example, GSM, GSM plus EDGE, CDMA, quadband, and other cellular protocols. In another example, a long range communications protocol can include Wi-Fi and protocols for placing or receiving calls using VOW, LAN, WAN, or other TCP-IP based communication protocols. The transmitting device 112 and receiving device 111, when located within communications network 110, may communicate over a bidirectional communication path such as path 113, or over two unidirectional communication paths. Both the transmitting device 112 and receiving device 111 may be capable of initiating a communications operation and receiving an initiated communications operation.

The transmitting device 112 and receiving device 111 may include any suitable device for sending and receiving communications operations. For example, the transmitting device 112 and receiving device 111 may include mobile telephone devices, television systems, cameras, camcorders, a device with audio video capabilities, tablets, wearable devices, other smart devices, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., e-mails, text messages, media messages), video communication, communications with calendaring applications, or combinations of these (e.g., video conferences).

Figure 2:
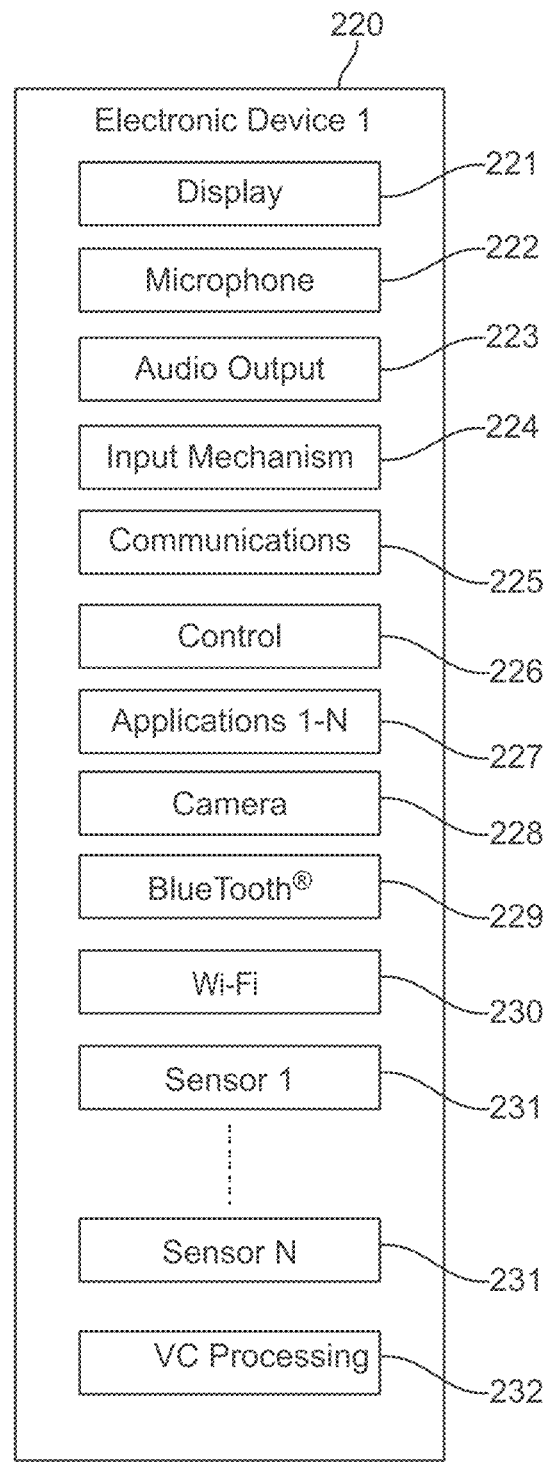
FIG. 2 shows a block diagram of architecture for a mobile electronic device system including vehicle communication (VC) processing, according to an embodiment.

FIG. 2 shows a functional block diagram of a mobile electronic device 220 that may be used for automatic retention, recommendation and collaboration (RRC) of mobile based task sessions, according to one embodiment. Both the transmitting device 112 and receiving device 111 may include some or all of the features of the electronics device 220. In one embodiment, the electronic device 220 may comprise a display 221, a microphone 222, an audio output 223, an input mechanism 224, communications circuitry 225, control circuitry 226, Applications 1-N 227 (e.g., a calendaring application), camera 228, a BLUETOOTH® interface 229, a Wi-Fi interface 230 and sensors 1 to N 231 (N being a positive integer), vehicle communication (VC) processing 232 (e.g., VC processing using one or more processors, BLUETOOTH®, sensor data, Wi-Fi information, GPS information, infrared line-of-sight (LOS) information, etc.) and any other suitable components. In one embodiment, applications 1-N 227 are provided and may be obtained from a cloud or server via a communications network 210, etc., where N is a positive integer equal to or greater than 1.

In one embodiment, all of the applications employed by the audio output 223, the display 221, input mechanism 224, communications circuitry 225, and the microphone 222 may be interconnected and managed by control circuitry 226. In one example, a handheld music player capable of transmitting music to other tuning devices may be incorporated into the electronics device 220.

In one embodiment, the audio output 223 may include any suitable audio component for providing audio to the user of electronics device 220. For example, audio output 223 may include one or more speakers (e.g., mono or stereo speakers) built into the electronics device 220. In some embodiments, the audio output 223 may include an audio component that is remotely coupled to the electronics device 220. For example, the audio output 223 may include a headset, headphones, or earbuds that may be coupled to communications device with a wire (e.g., coupled to electronics device 220 with a jack) or wirelessly (e.g., BLUETOOTH® headphones or a BLUETOOTH® headset).

In one embodiment, the display 221 may include any suitable screen or projection system for providing a display visible to the user. For example, display 221 may include a screen (e.g., an LCD, LED, etc. screen) that is incorporated in the electronics device 220. Display 221 may be operative to display content (e.g., information regarding communications operations or information regarding available media selections) under the direction of control circuitry 226.

In one embodiment, input mechanism 224 may be any suitable mechanism or user interface for providing user inputs or instructions to electronics device 220. Input mechanism 224 may take a variety of forms, such as a button, keypad, dial, a click wheel, or a touch screen. The input mechanism 224 may include a multi-touch screen.

In one embodiment, communications circuitry 225 may be any suitable communications circuitry operative to connect to a communications network (e.g., communications network 110, FIG. 1) and to transmit communications operations and media from the electronics device 220 to other devices within the communications network. Communications circuitry 225 may be operative to interface with the communications network using any suitable communications protocol such as, for example, Wi-Fi (e.g., an IEEE 802.11 protocol), BLUETOOTH®, high frequency systems (e.g., 900 MHz, 2.4 GHz, and 5.6 GHz communication systems), infrared, GSM, GSM plus EDGE, CDMA, quad-band, and other cellular protocols, VOW, TCP-IP, or any other suitable protocol.

In some embodiments, communications circuitry 225 may be operative to create a communications network using any suitable communications protocol. For example, communications circuitry 225 may create a short-range communications network using a short-range communications protocol to connect to other communications devices. For example, communications circuitry 225 may be operative to create a local communications network using the BLUETOOTH® protocol to couple the electronics device 220 with a BLUETOOTH® headset.

In one embodiment, control circuitry 226 may be operative to control the operations and performance of the electronics device 220. Control circuitry 226 may include, for example, one or more processors, a bus (e.g., for sending instructions to the other components of the electronics device 220), memory, storage, or any other suitable component for controlling the operations of the electronics device 220. In some embodiments, a processor may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 220 performs communications operations (e.g., saving contact information related to communications operations or storing information related to different media types and media items selected by the user).

In one embodiment, the control circuitry 226 may be operative to perform the operations of one or more applications implemented on the electronics device 220. Any suitable number or type of applications may be implemented. Although the following discussion will enumerate different applications, it will be understood that some or all of the applications may be combined into one or more applications. For example, the electronics device 220 may include a calendaring application (e.g., MICROSOFT® OUTLOOK®, GOOGLE® Calendar, etc.), an automatic speech recognition (ASR) application, a dialog application, a map application, a media application (e.g., QuickTime, MobileMusic.app, or MobileVideo.app), social networking applications (e.g., FACEBOOK®, TWITTER®, INSTAGRAM®, etc.), an Internet browsing application, etc. In some embodiments, the electronics device 220 may include one or multiple applications operative to perform communications operations. For example, the electronics device 220 may include a messaging application, a mail application, a voicemail application, an instant messaging application (e.g., for chatting), a videoconferencing application, a fax application, or any other suitable applications for performing any suitable communications operation.

In some embodiments, the electronics device 220 may include a microphone 222. For example, electronics device 220 may include microphone 222 to allow the user to transmit audio (e.g., voice audio) for speech control and navigation of applications 1-N 227, during a communications operation or as a means of establishing a communications operation or as an alternative to using a physical user interface. The microphone 222 may be incorporated in the electronics device 220, or may be remotely coupled to the electronics device 220. For example, the microphone 222 may be incorporated in wired headphones, the microphone 222 may be incorporated in a wireless headset, the microphone 222 may be incorporated in a remote control device, etc.

In one embodiment, the camera 228 comprises one or more camera devices that include functionality for capturing still and video images, editing functionality, communication interoperability for sending, sharing, etc., photos/videos, etc.

In one embodiment, the BLUETOOTH® interface 229 comprises processes and/or programs for processing BLUETOOTH® information, and may include a receiver, transmitter, transceiver, etc.

In one embodiment, the electronics device 220 may include multiple sensors 1 to N 231, such as accelerometer, gyroscope, microphone, temperature, light, barometer, magnetometer, compass, radio frequency (RF) identification sensor, global positioning system (GPS), Wi-Fi, etc. In one embodiment, the multiple sensors 1-N 231 provide information to the VC processing 232. In one embodiment, the multiple sensors 1-N 231 may be aggregated or used from different electronic devices, such as an electronic device 220 (e.g., a smartphone, a smart dash cam, a tablet, a wearable, a smart vehicle system, etc.) and another electronic device 220. For example, a gyroscope sensor and/or a temperature may be used from a wearable device, and a microphone sensor may be used from a smartphone.

In one embodiment, the electronics device 220 may include any other component suitable for performing a communications operation. For example, the electronics device 220 may include a power supply, ports, or interfaces for coupling to a host device, a secondary input mechanism (e.g., an ON/OFF switch), or any other suitable component.

In one embodiment, the VC processing 232 provides the following processing with devices and applications (or apps) 1-N 227 of electronic device 220, along with any required communication with a cloud computing environment, network 110, etc. In one embodiment, the VC processing 232 provides the identifier driver (e.g., Driver A) a safe and easy way to alert another driver (e.g., Driver B) of a potential problem with their vehicle (e.g., a tire that is underinflated or flat; open trunk, unfastened gas cap, light not when it iss dark, etc.). The communication of an alert (e.g., a predetermined message, a photo, or both) via wireless technology (e.g., BLUETOOTH®, cellular, etc.) may prevent unnecessary accidents and/or damage to Driver B's vehicle. In one embodiment, geo-targeting is used to connect to a smart device (e.g., electronics device 220, a vehicle's smart system (using, voice and/or display, vibration, etc.) that is no farther than, for example, 50 feet away, from the driver/passenger (e.g., Driver A/Passenger A) that identifies a problem to a person (e.g., Driver B) in a nearby vehicle.

In one example embodiment, the VC processing 232 targets all vehicles in the "zone" or radius for wireless communication, not a specific vehicle. Then, the identifier points their smart device in the direction of the vehicle that has a problem, establishes a connection with a smart device in that vehicle, may take a photo of the problem (e.g., using a camera from the smart device), and sends a pre-determined message with the picture stating the problem. In one embodiment, pre-determined messages are used to communicate the alert and to disallow sending "rude" ad hoc messages, misspelled messages, etc.). The alert or notification is targeted only to the targeted recipient (e.g., Driver B) and not everyone with wireless capabilities. There already exists ways to communicate to a driver in another vehicle such as, ham radios and citizen band (CB) radios (over a public broadcast), flashing headlights (which everyone in the vicinity can see) and sounding a horn. With smart devices becoming commonplace, one embodiment provides a universal way to communicate with a specific Driver B, no matter what language they speak. By sending a photo of the potentially dangerous part on the vehicle, the receiver (e.g., Driver B) would be able to comprehend the issue at hand.

In one embodiment, for determining which vehicles are "nearby" (e.g., within 50-foot radius, etc.) and selecting which one in particular to notify may be performed, for example, using:

1. WiFi to determine which networks are presently seen in the area;
2. Using a geo-fenced radius from the alerting vehicle and a directory including the known the geo-tags of other vehicles; and
3. Scanning for nearby BLUETOOTH® devices.

In one embodiment, for determining which of the nearby cars is the one that needs to be alerted, the following may be implemented. In one example, descriptive tags about the car in the identity of the network (e.g., for WiFi or BLUETOOTH® devices) are used which may then be parsed and displayed to the user for selection of the appropriate vehicle. For example, a WiFi network name could be:
carTroubleDetection?brand=hyundai&model=q elantra&year=2013&plate=CAR523. In another example, a line-of-sight (LOS) technology (such as infrared) along with a receiver on the vehicle to allow for a "point and choose" type of experience may be implemented. In this example, a user may send a request to vehicle's infrared (IR) receiver, and the IR receiver may respond with a request to start a connection (e.g., WiFi or BLUETOOTH®), which may then be used for the larger transmission of data (e.g., the alert message of the issue, a photo, etc.).

Figure 3:
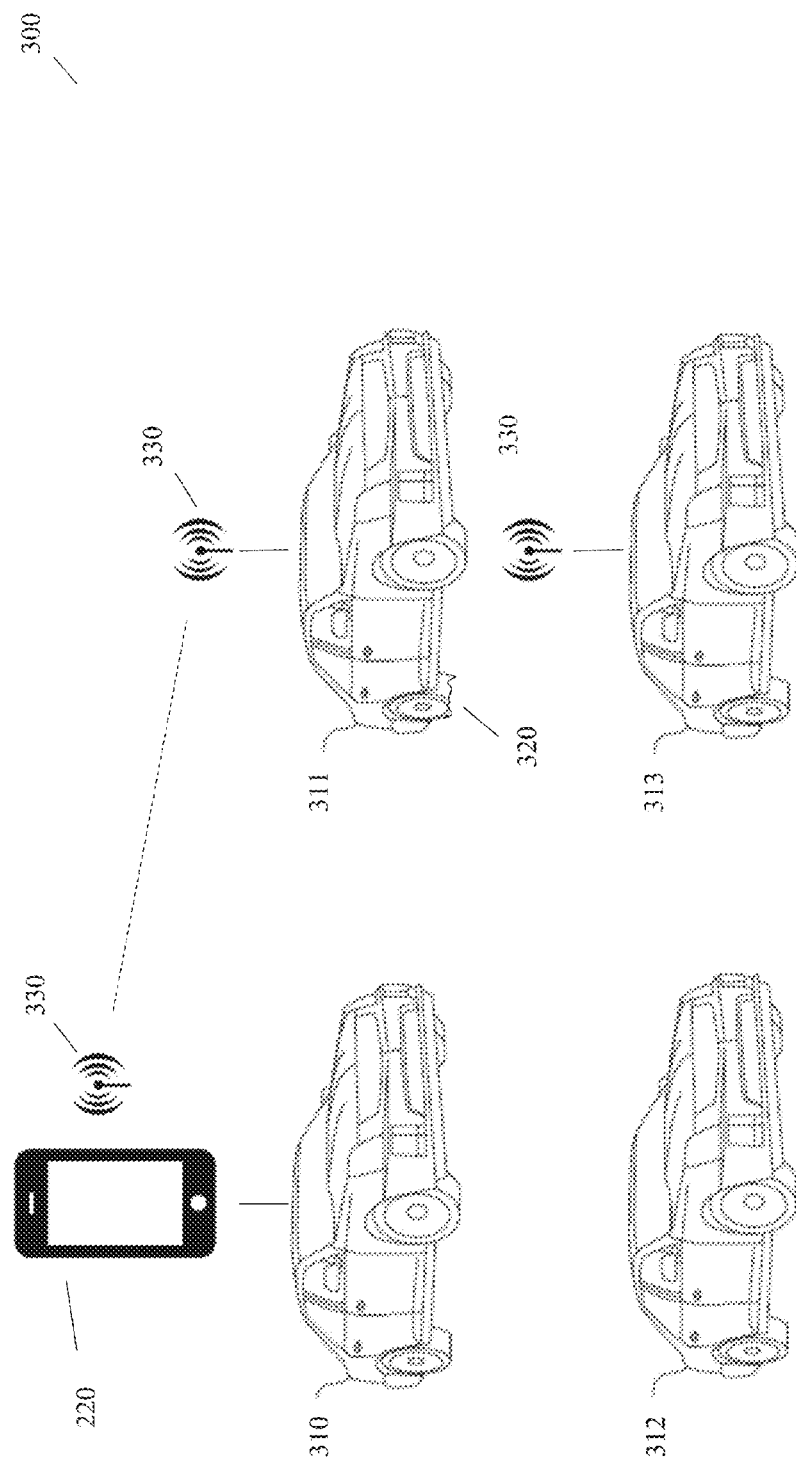
FIG. 3 shows an example of a scenario for using an embodiment for communicating an alert to a driver of a particular vehicle, according to one embodiment.

FIG. 3 shows an example of a scenario 300 for using an embodiment for communicating an alert to a driver of a particular vehicle, according to one embodiment. In the scenario 300, four vehicles (vehicle 310, 311, 312 and 313) are shown within a radius or range (e.g., 50 feet) of vehicle 310 for wireless communication 330. In scenario 300, only vehicles 310, 311 and 313 can communicate with wireless communication 330 (e.g., WiFi, BLUETOOTH®, cellular, etc.). The driver or passenger of vehicle 310 sees an issue 320 with vehicle 311 (e.g., a flat tire or a very low tire). The driver or passenger of vehicle 310 launches VC processing 232 (FIG. 2) using an app 1 227. The VC processing 232 determines that there are two vehicles (vehicle 311 and vehicle 313) having devices that can communicate wirelessly in range. In one example, the passenger or driver of vehicle 310 points to an electronic device 220 at vehicle 320 to establish a wireless connection (e.g., WiFi, BLUETOOTH®, cellular, etc.). Once the connection is established, the driver or passenger of vehicle 310 sends a predetermined message (e.g., "Your rear right tire is low")

and a photo taken using camera 228 of the rear right tire to an electronic device 220 in vehicle 311.

In another example, the driver or passenger of vehicle 310 finds all of the vehicles 311-313 in the radius and determines they are in a directory of geo-tags that provide identification that may be compared to a visual inspection of the vehicle. In another example, the driver or passenger in vehicle 310 searches for WiFi networks in the radius and compares the WiFi network names to a visual inspection of the vehicles 311-313 to determine that the alert should be sent to vehicle 311.

Figure 4:
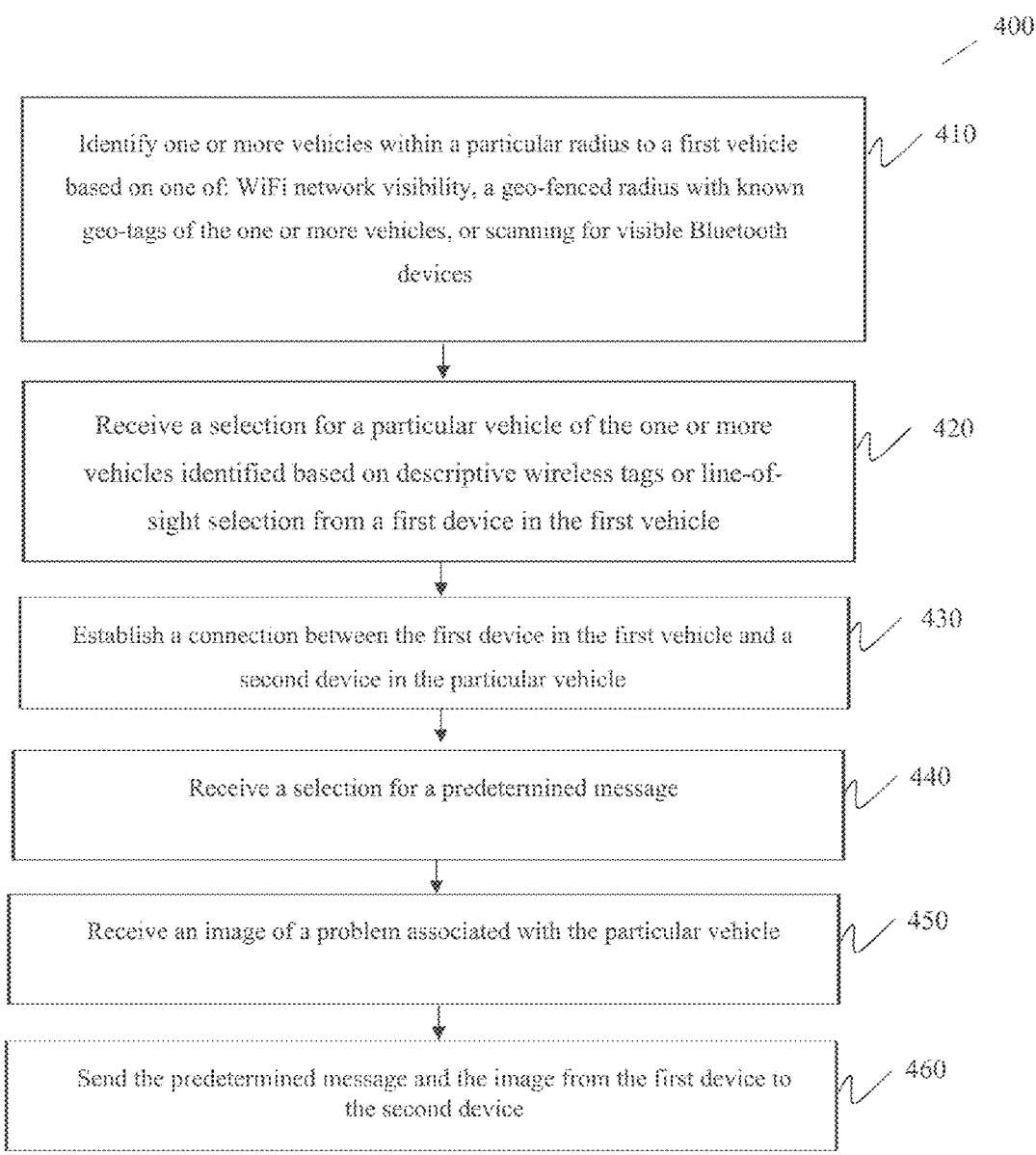
FIG. 4 illustrates a block diagram for a process for wirelessly alerting a driver in another vehicle of a potential or actual problem, according to one embodiment.

FIG. 4 illustrates a block diagram for a process 400 for VC processing, according to one embodiment. The process 400 includes a computer program product for communicating a notification to a particular vehicle. Block 410 includes identifying (e.g., by a processor(s) of control circuitry 226 (FIG. 2) one or more vehicles within a particular radius (e.g., 50 feet) to a first vehicle (e.g., Vehicle A) based on one of: WiFi network visibility, a geo-fenced radius with known geo-tags of the one or more vehicles, or scanning for visible BLUETOOTH® devices. Block 420 includes receiving (e.g., by the processor(s)), a selection for a particular vehicle (e.g., Vehicle B) of the one or more vehicles identified based on descriptive wireless tags or line-of-sight selection from a first device (e.g., a n electronic device 220) in the first vehicle. Block 430 includes establishing (by the processor (s)) a connection between the first device in the first vehicle and a second device (e.g., another electronic device 220) in the particular vehicle. Block 440 includes receiving (e.g., by the processor(s)) a selection for a predetermined message (e.g., an alert such as "you have a low tire," you have a flat tire," "your trunk is open," etc.). In block 450, process 400 includes receiving (e.g., by the processor(s)) an image of a problem associated with the particular vehicle (e.g., a photo from the camera 228 including the second vehicle's issue, such as a photo of a low front tire, etc.). Block 460 includes sending (e.g., by the processor(s)) the predetermined message and the image from the first device to the second device (e.g., via BLUETOOTH®, WiFi, cellular, etc.).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for communicating a notification to a particular vehicle, the computer program product comprising a non-transitory computer readable storage device having program instructions embodied therewith, the program instructions executable by a processor to cause the processor to:
    identify, by the processor, one or more vehicles within a particular radius to a first vehicle based on one of: WiFi network visibility, a geo-fenced radius with known geo-tags of the one or more vehicles, or scanning for visible Bluetooth devices;
    receive, by the processor, a selection for a particular vehicle of the one or more vehicles identified based on descriptive wireless tags or line-of-sight selection from a first device in the first vehicle;
    establish, by the processor, a connection between the first device in the first vehicle and a second device in the particular vehicle;
    receive, by the processor, a selection for a predetermined message;
    receive, by the processor, an image of a problem associated with the particular vehicle; and
    send, by the processor, the predetermined message and the image from the first device to the second device.

* * * * *